United States Patent
Keranen

(10) Patent No.: US 10,655,273 B2
(45) Date of Patent: May 19, 2020

(54) DYED FIBERS AND METHODS OF DYEING USING N,N'-DIACETYL INDIGO

(71) Applicant: Stony Creek Colors, Inc., Goodlettsville, TN (US)

(72) Inventor: Mark D. Keranen, Greenbrier, TN (US)

(73) Assignee: Stony Creek Colors, Inc., Goodlettsville, TN (US)

(*) Notice: Subject to any disclaimer, the term of this patent is extended or adjusted under 35 U.S.C. 154(b) by 0 days.

(21) Appl. No.: 16/023,652

(22) Filed: Jun. 29, 2018

(65) Prior Publication Data

US 2019/0010659 A1    Jan. 10, 2019

Related U.S. Application Data

(60) Provisional application No. 62/529,248, filed on Jul. 6, 2017.

(51) Int. Cl.
| | |
|---|---|
| *A61Q 5/10* | (2006.01) |
| *D06P 1/22* | (2006.01) |
| *C09B 7/02* | (2006.01) |
| *D06P 1/16* | (2006.01) |

(52) U.S. Cl.
CPC .............. *D06P 1/228* (2013.01); *C09B 7/02* (2013.01); *D06P 1/16* (2013.01)

(58) Field of Classification Search
CPC .... D06P 1/228; D06P 1/22; D06P 1/16; D06P 3/82; D06P 1/67391; D06P 1/67383
See application file for complete search history.

(56) References Cited

U.S. PATENT DOCUMENTS

| | | |
|---|---|---|
| 3,595,657 A | 7/1971 | Robinson et al. |
| 3,595,659 A | 7/1971 | Gerlach et al. |
| 4,004,572 A | 1/1977 | Nathan et al. |

(Continued)

FOREIGN PATENT DOCUMENTS

| | | |
|---|---|---|
| CA | 1066223 A | 11/1979 |
| CA | 1080849 A | 7/1980 |

(Continued)

OTHER PUBLICATIONS

English transaltion of the DE Patent No. 448909 (Aug. 31, 1927).*

(Continued)

*Primary Examiner* — Eisa B Elhilo
(74) *Attorney, Agent, or Firm* — Kagan Binder, PLLC

(57) ABSTRACT

Described herein are methods of dyeing fibers, and dyed fibers and textiles made using the methods. The methods involve contacting a fiber with a dye liquor at a dye liquor temperature of about 30° C. to 115° C. to form a dyed fiber, wherein the dye liquor components include at least N,N'-diacetyl indigo and a salt solution having ionic strength of about 0.03 M (moles/liter) to 1 M and pH of about 3 to 8 at 20° C. The contacting is generally carried out for a contact period of about 10 seconds to 30 minutes, for example by immersing the fiber in the heated dye liquor. By using the disclosed methods, N,N'-diacetyl indigo is substantially uniformly distributed on the dyed fiber to provide intense, vibrant colors affixed thereto. Dyed textiles display substantially uniform color.

14 Claims, 1 Drawing Sheet
(1 of 1 Drawing Sheet(s) Filed in Color)

(56) References Cited

U.S. PATENT DOCUMENTS

| | | | |
|---|---|---|---|
| 4,004,573 | A | 1/1977 | Frieling et al. |
| 4,078,229 | A | 3/1978 | Swanson et al. |
| 4,288,861 | A | 9/1981 | Swainson et al. |
| 4,449,516 | A | 5/1984 | Kitao et al. |
| 4,459,682 | A | 7/1984 | Mossberg |
| 4,466,080 | A | 8/1984 | Swainson et al. |
| 4,471,470 | A | 9/1984 | Swainson et al. |
| 4,497,724 | A | 2/1985 | Kitao et al. |
| 5,586,992 | A | 12/1996 | Schnitzer et al. |
| 2009/0226948 | A1 | 9/2009 | Reichert et al. |
| 2009/0265867 | A1 | 10/2009 | Ronchi |

FOREIGN PATENT DOCUMENTS

| | | |
|---|---|---|
| DE | 448909 C | 8/1927 |
| DE | 4227507 A1 | 2/1994 |
| EP | 0085392 A2 | 8/1983 |
| EP | 0094195 B1 | 2/1986 |
| WO | 2012/127502 A1 | 9/2012 |
| WO | 2014/174114 A2 | 10/2014 |
| WO | 2017/223369 A1 | 12/2017 |

OTHER PUBLICATIONS

International Search Report for Application No. PCT/US2018/040279, dated Oct. 15, 2018, 5 pages.

Written Opinion for Application No. PCT/US2018/040279, dated Oct. 15, 2018, 8 pages.

C. Liebermann et al., About Acetylindingweiss and Acetylindigo, GDCh Chemische Berichte, 1891, pp. 4130-4136 (7 pages of Official Copy and 1 page Of English Summary Enclosed).

Falk et al., "The Stereochemistry Of Indigo. Preliminary Communication," Journal Of The American Chemical Society, 1907, vol. 29, Issue 12, pp. 1739-1744.

Von G. Engi, About new derivatives of the indigo and other indigoider colorings, Angewandte Chemie International Edition, 1914, vol. 27, Issue 20, pp. 144-148 (English Copy Not Available).

D. Vorländer et al, "About Diacetyl-indigo", European Journal of Inorganic Chemistry, vol. 52, Issue 2, 1919, p. 325 (English Copy Not Available).

Theodor Posner, "Contributions to the knowledge of the Indigo-Gruppe, VI.: About the effect of acid chloride on indigo and Indigo-Derivate, as well as about the space formula of the indigo", European Journal of Inorganic Chemistry, vol. 59, Issue 8, 1926, pp. 1799-1827 (English Copy Not Available).

Blanc et al,, "A Procedure for Determining the Absorption Spectra of Mixed Photochromic Isomers Not Requiring Their Separation", The Journal of Physical Chemistry, vol. 72, No. 8, 1968, pp. 2817-2824.

H. Goerner et al, "Laser flash studies of thioindigo and indigo dyes. Evidence for a trans configuration of the triplet state", Chemical Physics Letters, vol. 66, Issue 2, 1979, pp. 363-369.

H. D. Breuer et al., "Photoacoustic study of the photochemistry of adsorbed indigoid dyes", Applied Optics, vol. 21, Issue 1, 1982, pp. 41-43.

Lee et al., "Homogeneous and Heterogeneous Photocatalysis", Series C: Mathematical and Physical Sciences vol. 147, 1986, 25 pages.

Helmut Görner et al, "Trans to cis photoisomerization of N,N'-disubstituted indigo dyes via excited singlet states; a laser flash photolysis and steady state irradiation study", Canadian Journal of Chemistry, vol. 65, No. 4, 1987, pp. 708-717.

Douglas et al, "Substituent and Solvent Effects on the Thermal Isomerisation of 7HPyrazolo [5,1-c]-1 ,2,4-triazole Azomethine Dyes", Journal of the Chemical Society, Perkin Transactions 2, 1991, pp. 1363-1367.

Smith et al, "[ 1,3] Alkyl Migration as a Third Type of N,N'-Dialkanoylindigo Photochemistry", The Journal of Organic Chemistry, vol. 58, No. 23, 1993, pp. 6493-6496.

R.W. Sinkeldam, "Foldamers and Chromophores" (Dutch Ph.D. thesis, Technische Universiteit Eindhoven), 2006, 148 pages.

Porada et al, "Planar and distorted indigo as the core motif in novel chromophoric liquid crystals", New Journal of Chemistry, vol. 39, pp. 8291-8301.

Kolaczkowski et al., "Stepwise Bay Annulation of Indigo for the Synthesis of Desymmetrized Electron Acceptors and Donor-Acceptor Constructs", Organic Letters, vol. 18, pp. 5224-5227.

Clyde B. Anderson, "Dyeing Reactive Dues Using Less Salt", American Dyesrtuff Reporler, Sep. 1994, pp. 103-105.

Liebermann et al., "Acetyl Indigo White and Acetyl Indigo," Journal of the Society Of Dyers and Colourists, 1892, vol. 8, p. 93.

Falk et al., "The Stereochemistry of Indigo," Journal of the American Chemical Society, 1908, vol. 30, p. 143.

International Search Report for International Application No. PCT/US18/64223, dated Feb. 15, 2019, 6 pages.

Written Opinion for International Application No. PCT/US18/64223, dated Feb. 15, 2019, 5 pages.

Setsune et al., "Synthesis of N,N'-Diacylindigotins (N,N'-Diacyl-2,2'-bi-indolinylidene-3,3'-diones) via an Oxidative Oxygen-to-Nitrogen Acyl Shift of O,O'-Diacyl-leucoindigos (3,3'-Diacyloxy-2,2'-bi-indolyls)", Journal of the Chemical Society—Perkin Transactions, Issue 10, 1984, pp. 2305-2309.

Setsune et al., "Synthesis and cis-to-trans Isomerization of N,N'-Diacyl Derivatives of Indigotin", Journal of the Chemical Society—Chemicaf Communications, Issue 17, 1982, pp. 1022-1023.

\* cited by examiner

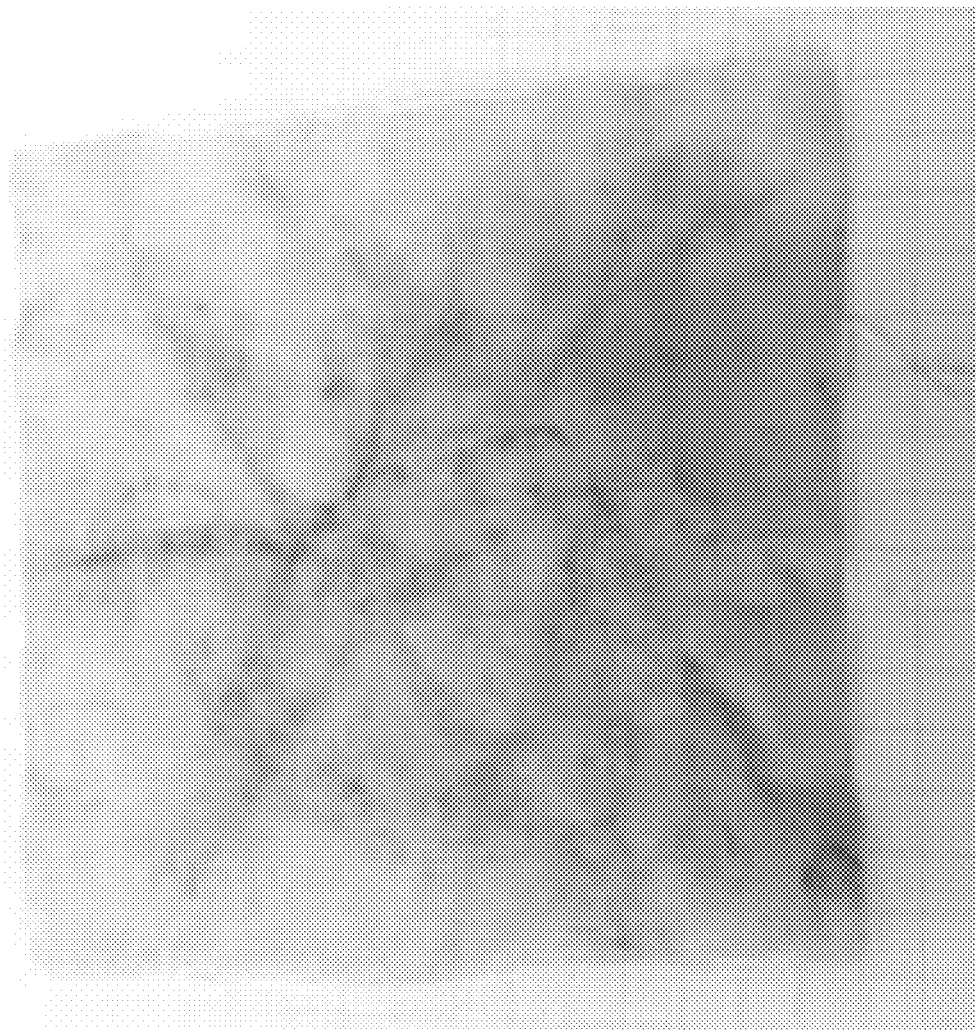

DYED FIBERS AND METHODS OF DYEING USING N,N'-DIACETYL INDIGO

BACKGROUND

Indigo is a dark blue crystalline powder that sublimes at 390-392° C. (734-738° F.). It is insoluble in water, alcohols, and ethers and is soluble in DMSO, chloroform, nitrobenzene, and sulfuric acid (conc). The chemical formula of indigo is $C_{16}H_{10}N_2O_2$ and its IUPAC name is (2E)-2-(3-oxo-1H-indol-2-ylidene)-1H-indol-3-one.

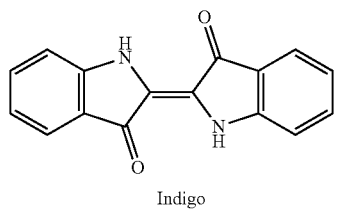 [SMILES: O=C1/C(=C2\Nc3ccccc3C2=O)Nc2ccccc21]

Indigo

Indigo is one of the first dyes to be used by humans for textile dyeing and printing. The compound has been detected on fabrics as old as 6000 years. Indigo is characteristically associated with its distinctive blue color. Indigo was originally extracted from the leaves of certain types of indigo plants, and was highly valued prior to the development of synthetic dyes since natural blue dyes are rare. The first laboratory synthesis of indigo was reported in 1878. By 1897, a commercially feasible manufacturing process was developed that largely replaced the use of naturally-sourced indigo. It is estimated that in 2013, 67,000 tons of synthetic indigo were produced worldwide.

Derivatives of indigo have also been used to obtain various colors. For example, thioindigo (NH groups replaced with S) is deep red; 6,6'-dibromoindigo is known as Tyrian purple; 5,5',7,7'-tetrabromoindigo is known as Ciba blue; and sulfonation of indigo results in blue-green derivative known as "indigo carmine". Indigo derivatives are employed as colorants in the food, pharmaceuticals, and cosmetics industries.

Indigo itself is problematic in fiber dyeing processes because it is insoluble in water. Commercially, the compound is dissolved in water by reduction to leucoindigo, also referred to as "indigo white".

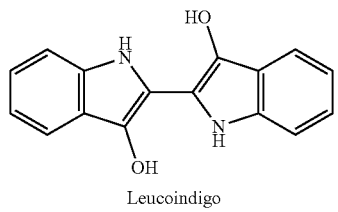 [SMILES: Oc1c(-c2[nH]c3ccccc3c2O)[nH]c2ccccc12]

Leucoindigo

Changes in both color and solubility upon reduction are attributable to the loss of planarity of the molecule. The originally developed indigo dyeing process involves immersing cotton fibers in an alkaline dyebath including indigo and a reducing agent; the reducing agent reduces the indigo to leucoindigo in the bath. Upon removing the fabric from the dyebath, leucoindigo quickly oxidizes, reverting to the insoluble, intensely colored indigo. The solubility properties of indigo and the resulting severity of chemical conditions required to use it in aqueous vat dyeing processes historically limited its broader use.

N,N'-diacetyl indigo is a known derivative of indigo and is represented by the following formula:

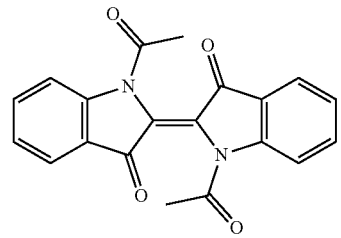

N,N'-diacetyl indigo

The compound was reported at least as early as 1891 by Liebermann and Dickhutt, Chem. Ber. 1891, 24, 4130, further as reported in Journal of the Society of Dyers and Colorists, 1892, 8, 93. N,N'-diacetyl indigo is an air-stable, brick-red, particulate solid at 20°/1 atm. It is insoluble in water and obtains hues ranging from bright red to pink when dissolved in organic solvents. Isomerization, including photoisomerization, from trans to cis provides a photochromic shift to yellow hues.

N,N'-diacetyl indigo has been used as a disperse dye, employing temperatures between 180° C. and 220° C. to achieve colors ranging from blues to bright purples when combined with polyester or cellulose acetate fibers and fabrics.

Due to π-conjugation, indigo derivatives including N,N'-diacetyl indigo have been employed as organic semiconductors and functionalized with long-chain alkyl groups to form liquid crystalline morphologies. N,N'-diacetyl indigo has also been used in a direct positive bleach-out photographic system (exemplary is U.S. Pat. No. 3,595,659); in photoreactive optical elements for computer memory systems (exemplary are U.S. Pat. Nos. 4,288,861 and 4,459,682); and as means for storing solar energy (exemplary is U.S. Pat. No. 4,449,516).

In recent years, a return to natural sources of colorants has been driven by the desire to avoid industrial syntheses that externalize environmental pollutants. As a result, there is a renewed need for fiber dyeing methodologies that are useful in conjunction with naturally extracted plant-based colorants such as indigo, or simple derivatives thereof. There is a need for fiber dyeing methodologies that employ aqueous systems and reduce the amount of harmful chemicals used in the dyeing process. There is a need to broaden the toolkit of the fiber colorist using natural products and derivatives thereof as well as environmentally benign compounds and methods.

SUMMARY

Described herein is a method of dyeing a fiber, the method comprising or consisting essentially of contacting the fiber with a dye liquor at a dye liquor temperature of about 30° C. to 115° C. to form a dyed fiber, the dye liquor comprising or consisting essentially of N,N'-diacetyl indigo and a salt solution having ionic strength of about 0.03 M (moles/liter) to 1 M and pH of about 3 to 8 at 20° C. In embodiments, the contacting is carried out for a contact period of about 10 seconds to 30 minutes. In some embodiments, the temperature of the dye liquor is adjusted to about 30° C. to 115° C. before the contacting, while in other embodiments, the temperature of the dye liquor is adjusted after the contacting. In embodiments, the aqueous salt solution includes about 1 wt % to 10 wt % salt. In embodiments N,N'-diacetyl indigo is added to the bath at a weight ratio of 1 part N,N'-diacetyl indigo to about 2 to 1000 parts salt solution.

The dye liquor is formed by combining water, salt, and N,N'-diacetyl indigo in any order. In embodiments, the salt solution comprises two or more salts. In embodiments, the salt solution comprises one or more inorganic salts. In some such embodiments the salt solution comprises sodium chloride, sodium sulfate, or a combination thereof. In some embodiments, a buffer is further added to the dye liquor in order to maintain pH at a selected value or range of values between about 3 and 8. In embodiments, the dye liquor further comprises one or more adjuvants.

In some embodiments the contacting comprises, consists essentially of, or consists of immersing a fiber in a heated dye liquor; in other embodiments, the contacting comprises, consists essentially of, or consists of contacting a fiber with a volume of dye liquor that is completely or substantially completely absorbed by the fiber during the contacting. In some such embodiments, the dye liquor is a heated dye liquor. In embodiments the fiber is washed with water after the contact period.

In embodiments, the fiber is a textile fiber. In embodiments, the textile fiber is a discrete portion of a textile. In embodiments, the textile fiber comprises, consists essentially of, or consists of one or more textile polymers. In embodiments, the one or more textile polymers comprise or consist essentially of polyamide, polyester, cellulose, cellulose acetate, polyolefin, hemicellulose, polyacrylonitrile and copolymers thereof, naturally sourced materials such as cotton, wool, bamboo, leather, flax, or silk, or blends or copolymers of two or more of any of the foregoing.

In some embodiments, the contact period is the amount of time sufficient to exhaust substantially all of the N,N'-diacetyl indigo from the dye liquor; in other embodiments the contact period is ended when the textile fiber has taken up a selected amount of the N,N'-diacetyl indigo, wherein the selected amount is the amount, in terms of weight percent on fiber (% wof) to obtain a selected color value, wherein the selection is made by the user (that is, the textile colorist).

Also described herein is a dyed fiber comprising or consisting essentially of a fiber and N,N'-diacetyl indigo. In embodiments the fiber comprises or consists essentially of one or more textile polymers. In embodiments, the one or more textile polymers comprise, consist essentially of, or consist of polyamide, polyester, polysaccharide, cellulose acetate, polyacrylonitrile, polyolefin, wool, bamboo, leather, flax, silk, cotton, or blends or copolymers of two or more thereof. In embodiments the fiber is characterized as a textile fiber. Also described herein is a dyed textile, including a contacted assembly of dyed textile fibers. In embodiments the N,N'-diacetyl indigo is substantially uniformly distributed on the dyed textile fibers. In embodiments the N,N'-diacetyl indigo is substantially uniformly distributed on the dyed textile.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a photographic image of a textile dyed in a Control process.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the term "salt solution" means a combination comprising liquid water and an ionic compound or a salt, wherein the ionic compound or salt is substantially completely dissolved in the water. In embodiments, the ionic compound includes one or more organic compounds (that is, containing carbon). In other embodiments, the ionic compound includes one or more inorganic compounds. In still other embodiments, the ionic compound is a mixture of one or more organic compounds and one or more inorganic compounds.

As used herein, the term "ionic strength" or $I_c$, in reference to a salt solution means the sum of all ions in a solution according to the equation $$I_c = \frac{1}{2}\sum c_B z_B^2,$$

wherein c=concentration of an ion B in moles/liter (M); and z=ionic charge of ion B.

As used herein, "dye", "dyeing" and like terms refer generally to an aqueous process of affixing N,N'-diacetyl indigo to a fiber or textile. A colorant is considered to be "affixed to a fiber" or textile when the colorant is not substantially removed by washing the fiber with water, as determined by colorimetric measurement or by visual confirmation such as observation of no color in wash water used to wash a dyed fiber or textile.

As used herein, "dye liquor", "liquor", and like terms means a combination comprising, consisting essentially of, or consisting of N,N'-diacetyl indigo and a salt solution, unless otherwise specified or determined by context.

As used herein, the term "liquor ratio" means the volume of a salt solution, in liters, divided by the mass of a fiber or a textile to be dyed, in kilograms. For example, 5 liters of a 1 mole/liter NaCl solution used to dye 1 kg of a textile obtains a liquor ratio of 5:1.

As used herein, the terms "diacetyl indigo" and "N,N'-diacetyl indigo" mean the compound represented by the formula

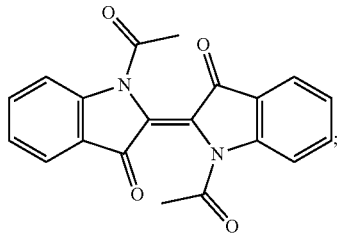 [SMILES: CC(=O)N1/C(=C2\C(=O)c3ccccc3N2C(C)=O)C(=O)c2ccccc21]

as specified or as determined by context, the terms "diacetyl indigo" and "N,N'-diacetyl indigo" may refer to an associative structure, derivative, product of an inter- or intramolecular reaction, or analog of N,N'-diacetyl indigo that is formed during or as a result of a dyeing process.

As used herein, the term "fiber" means a generally cylindrical solid article having a diameter, at any selected location along the cylinder length, of about 0.1 micrometer (0.1 m, or 100 nm) to 1 millimeter (1 mm), further wherein an aspect ratio is greater than or equal to 100:1 length:diameter, and wherein said aspect ratio may be as high as $10^8$:1. In embodiments, the fiber is a textile fiber, as specified or determined by context.

As used herein, the term "textile fiber" means a fiber that is a discrete portion of a textile. In embodiments, the textile fiber is a fiber comprising, consisting essentially of, or consisting of one or more textile polymers. A textile polymer is any polymer or blend of two or more polymers that is suitable for forming a textile, as will be discussed in more detail herein. In various embodiments, textile fibers have, are capable of obtaining, or are caused to obtain, an overall shape configuration that is linear, curved, curled, helical, kinked, randomly configured, substantially aligned along their length, or any other configuration; and can have aspects of two or more shape configurations as a result of the process of assembling a textile from a plurality of textile fibers, as specified or determined by context.

As used herein, "textile" means an assembly comprising or consisting essentially of a plurality of contacted textile fibers. In embodiments, the contacted textile fibers of the assembly have the same or substantially the same chemical composition. In embodiments the assembly is spun or bundled, such as in a thread or yarn; in other embodiments the assembly is a fabric (or "textile fabric"), such as in a woven or nonwoven fabric. In embodiments the assembly is a portion of a larger construction, such as a yarn or a thread looped through a backing or mat to provide a cut-pile or closed-loop type rug or carpet assembly, or a related fabric configuration.

As used herein, the term "fabric" means a substantially two-dimensional web type woven or nonwoven textile. Fabric may be referred to as a "cloth" or the like, as specified or determined by context.

As used herein, the term "woven" as applied to a textile means that the plurality of textile fibers are assembled into a fabric by a weaving process.

As used herein, the term "nonwoven" as applied to a textile means that the plurality of textile fibers are assembled into a fabric by a process other than weaving. Such processes include but are not limited to felting, knitting, melt blowing, solvent spinning, electrospinning, spunbonding, stitchbonding, and the like.

As used herein, the terms "color", "colorspace", L*a*b*, and similar terms refer to CIELAB color space and methods of colorimetric measurements thereof. CIELAB color space is a three dimensional representation of color visible to the average human eye, defined as luminance (L axis), having white at one extreme and black at the other; red-green (a axis), varying from red (+a) at one axis end to green (−a) at the other; and yellow-blue (b axis), varying from yellow (+b) at one axis end to blue (−b) at the other. In embodiments, the colorspace is measured by comparison to a standard, such as the d50 standard, to provide a uniform value of white (255, 0, 0). An approximation of the hues defined by a recitation of L*, a*, and b* values may be observed by referred to a colorspace guide such as that available for download at: www.cmykguide.com/pdf/1.%20CMYK %20GUIDE %20-%20CIE %20Lab %20color %20space.pdf.

As used herein, the term "natural" in reference to a fiber source or a textile source refers to fibers or textiles obtained from plants or animals. In mixtures of materials, a fiber or textile is considered to be "naturally sourced" if at least 50% by weight of a fiber or textile is obtained from plants or animals. A naturally sourced fiber or textile may be subjected to one or more chemical or mechanical treatments prior to a dyeing process.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes as a subset thereof "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

Described herein is a method for dyeing fibers with N,N'-diacetyl indigo (N,N'-diacetyl indigo) and dyed fibers including N,N'-diacetyl indigo. The dyeing is accomplished employing a simple salt solution plus the N,N'-diacetyl indigo. The method comprises or consists essentially of contacting a fiber with a dye liquor at a dye liquor temperature of about 30° C. to 115° C. for about 1 second to 30 minutes to form a dyed fiber. In some embodiments the contacting is contacting at atmospheric pressure. The dye liquor includes N,N'-diacetyl indigo and a salt solution, the salt solution having ionic strength of about 0.03 M (moles/liter) to 1 M and pH of about 3 to 8 at 20° C. In some embodiments the dye liquor consists essentially of N,N'-diacetyl indigo and a salt solution, whereas in other embodiments one or more adjuvants is further included in the dye liquor.

The salt solution is an aqueous solution comprising liquid water and an ionic compound or a salt, wherein the ionic compound or salt is substantially dissolved in the water. In some embodiments, the salt is completely dissociated in the water. In embodiments, the ionic compound includes organic content—that is, containing carbon. In other embodiments, the ionic compound is inorganic—that is, includes no carbon. In still other embodiments, the ionic compound is a mixture of compounds that do and do not include carbon. Carbon containing compounds useful in one or more dyeing methods disclosed herein include ammonium acetate, potassium formate, sodium acetate, trimethylammonium chloride, and the like. Inorganic compounds suitable as salts in one or more dyeing methods disclosed herein include halide and sulfate salts of ammonium, calcium, magnesium, sodium, or potassium cations.

The salt solution has ionic strength of about 0.01 M (moles/liter) to 1 M. The term "ionic strength" or $I_c$, refers to the sum of all ions in an aqueous solution according to the equation $$I_c = \frac{1}{2}\sum c_B z_B^2,$$

wherein
c=concentration of an ion B in moles/liter (M); and
z=ionic charge of ion B.

The ionic strength of the salt solution useful in a dye liquor is about 0.01 M to 1 M, for example about 0.03 M to 1 M, or about 0.05 M to 1 M, or about 0.07 M to 1 M, or about 0.09 M to 1 M, or about 0.10 M to 1 M, or about 0.15 M to 1 M, or about 0.25 M to 1 M, or about 0.35 M to 1 M, or about 0.50 M to 1 M, or about 0.60 M to 1 M, or about 0.70 M to 1 M, or about 0.80 M to 1 M, or about 0.90 M to 1 M, or about 0.01 M to 0.9 M, or about 0.01 M to 0.8 M, or about 0.01 M to 0.7 M, or about 0.01 M to 0.6 M, or about 0.01 M to 0.5 M, or about 0.01 M to 0.4 M, or about 0.01 M to 0.3 M, or about 0.01 M to 0.2 M, or about 0.01 M to 0.1 M, or about 0.05 M to 0.5 M, or about 0.05 M to 0.4 M, or about 0.05 M to 0.3 M, or about 0.05 M to 0.25 M, or about 0.05 M to 0.2 M, or about 0.05 M to 0.15 M, or about 0.05 M to 0.1 M, or about 0.1 M to 0.5 M, or about 0.1 M to 0.4 M, or about 0.1 M to 0.3 M, or about 0.1 M to 0.25 M, or about 0.1 M to 0.2 M, or about 0.1 M to 0.15 M.

The pH of the salt solution is between about 3.0 and 8.0 at 20° C. in order to be useful in forming a dye liquor. Thus, for example the pH of the salt solution is about 3.0 to 7.5 at 20° C., or about 3.0 to 7.0 at 20° C., or about 3.0 to 6.5 at 20° C., or about 3.0 to 6.0 at 20° C., or about 3.0 to 5.5 at 20° C., or about 3.0 to 5.0 at 20° C., or about 3.0 to 4.5 at 20° C., or about 3.0 to 4.0 at 20° C., or about 3.0 to 3.5 at 20° C., or about 4.0 to 8.0 at 20° C., 4.0 to 7.5 at 20° C., or about 4.0 to 7.0 at 20° C., or about 4.0 to 6.5 at 20° C., or about 4.0 to 6.0 at 20° C., or about 4.0 to 5.5 at 20° C., or about 4.0 to 5.0 at 20° C., or about 4.0 to 4.5 at 20° C., or about 5.0 to 8.0 at 20° C., 5.0 to 7.5 at 20° C., or about 5.0 to 7.0 at 20° C., or about 5.0 to 6.5 at 20° C., or about 5.0 to 6.0 at 20° C., or about 5.0 to 5.5 at 20° C., or about 6.0 to 8.0 at 20° C., 6.0 to 7.5 at 20° C., or about 6.0 to 7.0 at 20° C., or about 6.0 to 6.5 at 20° C., or about 6.0 to 6.0 at 20° C., or about 5.0 to 5.5 at 20° C.

Adjustment of the pH of the salt solution is not required in each and every case where the dyeing process is carried out. Many sources of water have a pH within the range of about 3.0 to 8.0, and in some such embodiments the pH of the water source and/or the salt solution is not adjusted further. In some embodiments the pH of the water source used to form the salt solution is measured, and pH is subsequently adjusted as necessary to be within the range of 3.0 to 8.0 or any selected value or range therein at 20° C. Suitable pH adjustment agents include Lewis acids or the conjugate bases thereof conventionally used in the textile dyeing industry, or an zwitterionic compound such as sulfamic acid or an amino acid. Examples of suitable pH adjustment agents include hydrochloric acid, sulfuric acid, phosphoric acid, citric acid, formic acid, and acetic acid. In some embodiments a pH adjustment agent is a free acid of one of the ionic compounds employed as the salt in the salt solution; thus, if the ionic compound is sodium chloride, then a suitable acid to lower pH is hydrochloric acid and a suitable base to raise pH is sodium hydroxide. Commercially obtained buffer formulations are also employed, in some embodiments, to maintain pH in the desired targeted range of about 3.0 to 8.0 as will be apparent to one of skill.

In embodiments, N,N'-diacetyl indigo is added to the salt solution to form a dye liquor. The addition of salt and N,N'-diacetyl indigo to water is suitably accomplished in any order. In some embodiments, the salt is dissolved in the water to form a salt solution, and the N,N'-diacetyl indigo is added to the salt solution. The dye liquor is a combination that comprises, consists essentially of, or consists of N,N'-diacetyl indigo and the salt solution as described above. In embodiments, the dye liquor comprises N,N'-diacetyl indigo, the salt solution, and one or more adjuvants. In embodiments, the dye liquor consists essentially of N,N'-diacetyl indigo, the salt solution, and one or more adjuvants.

As the term is used herein, an adjuvant refers to a chemical agent that is added to the dye liquor for a beneficial purpose. Beneficial purposes include but are not limited to: causing the dyeing process to occur at a faster rate; causing a greater amount of N,N'-diacetyl indigo to become affixed to a selected fiber; increasing uniformity of dye distribution on or between fibers; preventing foaming of the dye liquor during the dyeing process; lowering the temperature required to affix the N,N'-diacetyl indigo to the selected fiber; causing a non-exhaustive dyeing process to become exhaustive; increasing wash-fastness of the affixed dye (that is, reducing dye loss due to subsequent laundering, washing, or cleaning processes conventionally employed for textiles, as determined by textile use and by context); reducing or eliminating the growth of microbes in the dyeing apparatus and/or on a textile; and the like.

Types of adjuvants include but are not limited to surfactants, hydrotropes, anti-foaming agents, emulsifiers, demulsifiers, microbial inhibitors, corrosion inhibitors, scale inhibitors, ion exchange resins, UV radiation blocking agents, and textile treatment compounds. Surfactants include water dispersible and oil dispersible surface active compounds having one or more hydrophobic moieties selected from dialkyl siloxane, C8-C50 alkyl, C6-C50 aralkyl, and C1-C12 perfluoroalkyl, plus one or more hydrophilic groups selected from carboxylate, sulfonate, ammonium, and polyalkylene glycol moieties. The total amount of surfactant species present in the dye liquor is 0 wt % to 10 wt % based on the weight of the salt solution, for example about 0.001 wt % to 10 wt % of the salt solution, or about 0.001 wt % to 7 wt %, or about 0.001 wt % to 5 wt %, or about 0.001 wt % to 4 wt %, or about 0.001 wt % to 3 wt %, or about 0.001 wt % to 2 wt %, or about 0.001 wt % to 1 wt %, or about 0.01 wt % to 3 wt %, or about 0.1 wt % to 3 wt %, or about 0.1 wt % to 2 wt %, or about 0.1 wt % to 1 wt % based on the weight of the salt solution. In some embodiments the surfactant is also an emulsifier, a demulsifier, or an anti-foam agent.

Hydrotropes are compounds that tend to increase the solubility of hydrophobic compounds in aqueous solutions without forming micelles. In some embodiments a hydrotrope includes one or more hydrophobic moieties selected from C1-C8 alkyl, C6-C10 aralkyl, and C1-C2 perfluoroalkyl, plus one or more hydrophilic moieties selected from carboxylate, sulfonate, ammonium, and polyalkylene glycol moieties. Hydrotropes are characterized by a lack of self-aggregation properties and therefore are not characterized as surfactants. Hydrotropes are present in the dye liquor at 0 wt % to 25 wt % based on the weight of the salt solution, for example about 0.1 wt % to 25%, or about 0.1 wt % to 20 wt %, or about 1 wt % to 20 wt %, or about 1 wt % to 15 wt %, or about 1 wt % to 10 wt % based on the weight of the salt solution. Hydrotropes include compounds such as sodium benzoate and water soluble solvents such as alkylene glycols and dimers and trimers thereof, and related glycol ethers such as CELLOSOLVE® type solvents sold by the Dow Chemical Company of Midland, Mich.

Textile treatment compounds include materials such as fabric softeners, applied to fibers to increase the soft "hand" of a textile, and protective chemistries to prevent soiling, staining, or wetting of aqueous or oil substances on the textile. Such materials are not part of the dyeing process but may be advantageously included in the dye liquor to efficiently combine dyeing with another textile treatment in a single process. Protective chemistries include antistaining treatments such as polymethacrylic acid and copolymers thereof, antisoiling treatments such as silica or polyalkyl-carboxylate polymers as well as blends of these; and anti-wetting agents such as C6-C12 perfluorocarbon functional compounds. In embodiments where textile treatment compounds are present in the dye liquor, effective amounts are determined by the manufacturer and are suitably adapted by one of skill for application to a textile via the dye liquor and within the methodology described herein. In embodiments, any one textile treatment compound is present in the dye liquor at 0 wt % to 5 wt % based on the weight of the salt solution, for example about 0.001 wt % to 1 wt % based on the weight of the salt solution.

The dye liquor employed to form dyed fibers using the methods described herein is a combination comprising, consisting essentially of, or consisting of N,N'-diacetyl indigo and a salt solution. In some embodiments the dye liquor is a heated dye liquor. In embodiments the dye liquor is heated prior to or after the addition of a fiber to the dye liquor. In embodiments, the water used to form the dye liquor is heated prior the addition of one or more components of the dye liquor thereto. The dye liquor, or one or more components thereof, is heated either prior to or after contacting a fiber therewith. The temperature of the heated dye liquor or component thereof is about 30° C. to 115° C., further wherein the temperature is optimized for the dyeing process. Because of the chemical differences between textile fibers, the temperature leading to optimal rate of dye affixing and selected total amount of affixed dye varies within the stated range; we have found that temperature is a result-effective variable that depends at least on the chemical makeup of the fiber to be dyed. Additionally, in some embodiments the species of salt in the dye liquor and the ionic content of the dye liquor are optimized in conjunction with the selected dye liquor temperature to arrive at a specific dye liquor recipe, temperature, and time of contacting for each type of textile fiber subjected to the dyeing process as described herein throughout.

In embodiments, the temperature of the dye liquor employed for the methods described herein is any temperature between 30° C. and 115° C. as selected in 1° C. increments, such as 37° C., 68° C., 82° C., and the like; as well as ranges selected from any two temperatures within the range of 30° C. to 115° C. in 1° C. increments, such as 30° C. to 33° C., 60° C. to 115° C., 80° C. to 97° C., or 96° C. to 112° C., and the like without limit. In some embodiments the dyeing process is carried out under conditions of pressure in excess of atmospheric pressure. In embodiments, pressure between about 101 kPa (1 atm) and $3 \times 10^4$ kPa is applied during the dyeing process or during a portion of the process. In some embodiments, a pressure between about 101 kPa (1 atm) and 1 kPa is applied during the dyeing process or a portion thereof. In some such embodiments, the temperature of the heated dye liquor employed in a dyeing process conducted under applied pressure is lower than the temperature of the heated dye liquor that is optimally employed at atmospheric pressure.

The presently described methods comprise or consist essentially of contacting a fiber with a heated dye liquor for a contact period of about 1 second to 30 minutes, or about 10 seconds to 30 minutes, or about 10 second to 25 minutes, or about 10 second to 20 minutes, or about 10 second to 15 minutes, or about 10 second to 10 minutes, or about 10 seconds to 5 minutes, or about 10 seconds to 3 minutes, or about 10 seconds to 2 minutes, or about 10 seconds to 1 minute. The contact period is a heated contact period: that is, the contact period is measured as contact with the heated dye liquor that includes at least the salt solution and N,N'-diacetyl indigo, heated to the temperature selected as described above.

The foregoing methods employ an aqueous process of affixing N,N'-diacetyl indigo to a fiber. In embodiments, a fiber is a generally cylindrical article having a diameter at any selected location of about 0.1 micrometer (m) to 1 millimeter (mm), and an aspect ratio is at least 100:1 and is as high as $10^8:1$ length:diameter. In embodiments the fiber is a textile fiber. A textile comprises or consists essentially of a plurality of textile fibers disposed in a contacted assembly such as a woven or nonwoven assembly. Stated differently, a fiber is in some embodiments a discrete portion of a textile. Thus, in some embodiments, the methods described herein include contacting a textile with the heated dye liquor to form a dyed textile.

In various embodiments, discrete textile fibers are linear, curved, curled, helical, kinked, or any other configuration and can have aspects of two or more such shape configurations between fibers or within a single fiber. In embodiments, a textile fiber comprises, consists essentially of, or consists of one or more textile polymers. In some embodiments the textile fibers are bicomponent fibers, wherein two discrete textile polymers or blends thereof are present in two separate areas of the fiber, such as a core-shell or islands-in-the-sea fiber. In other embodiments, the textile fibers include two or more polymers as a blend in a substantially uniform single-component fiber. In embodiments, the one or more polymers comprise or consist essentially of polyamide such as nylon 6 or nylon 6,6; polyester such as polyethylene terephthalate or an aliphatic polyester or blend of two or more thereof; cellulose and related materials such as cellulose acetate and hemicellulose; polyacrylonitrile and copolymers thereof with vinyl chloride, vinylidene chloride, or vinyl bromide; polyolefins such as polyethylene, polypropylene, and copolymers thereof; natural textile fiber materials such as cotton, wool, bamboo, leather, flax, or silk, or blends or copolymers of two or more thereof. In some embodiments the textile is a spunbond, stitchbonded, or felted textile. In some embodiments, a textile includes a blend of two or more textile fibers while in other embodiments a textile is formed substantially from a single type of textile fiber. Suitable textiles for dyeing include commercially obtained textiles such as TENCEL® and LYOCELL®.

In conjunction with the selected fiber or textile, in some embodiments the dyeing process is further adjusted to provide a selected ratio of salt solution to textile weight, and/or a selected amount of N,N'-diacetyl indigo for addition to the dye liquor based on the weight of textile to be contacted with the heated dye liquor. The selected ratio of salt solution to textile weight is referred to herein as the "liquor ratio" is defined as the ratio of the volume of salt solution in liters to the mass of the fiber or textile to be dyed in kilograms. In embodiments, the liquor ratio employed in the methods described herein is about 1:1 to 100:1, for example about 1:1 to 50:1, or about 2:1 to 50:1, or about 5:1 to 50:1, or about 10:1 to 50:1, or about 20:1 to 50:1, or about 30:1 to 50:1, or about 40:1 to 50:1, or about 1:1 to 40:1, or about 1:1 to 30:1, or about 1:1 to 20:1, or about 1:1 to 10:1, or about 1:1 to 7:1, or about 1:1 to 5:1, or about 1:1 to 2:1. In embodiments N,N'-diacetyl indigo is added to the dye liquor based on the amount of N,N'-diacetyl indigo to be affixed to one or more fibers during the dyeing process. In such embodiments an amount is selected to result in at least 0.1 weight percent of N,N'-diacetyl indigo based on the starting weight of the fiber, or "% wof", and as much as 20% wof; often, intense and desirable colors are obtained by targeting between about 1% wof and 4% wof. In some embodiments, the selected amount of N,N'-diacetyl indigo together with the selected liquor ratio result in a dye liquor having 1 part N,N'-diacetyl indigo to 2 to 1000 parts salt solution, for example 1 part N,N'-diacetyl indigo to about 5 to 500 parts salt solution, or 1 part N,N'-diacetyl indigo to about 10 to 100 parts salt solution.

In some embodiments, the N,N'-diacetyl indigo is preferentially taken up from the dye liquor by the fiber during the dyeing process. Stated differently, the N,N'-diacetyl indigo is "exhausted" from the dye liquor during one or more dyeing processes as described herein. In such embodiments, one of skill may select an amount of N,N'-diacetyl indigo to provide the desired color to a textile or to textile fibers (such as a calculated weight percent N,N'-diacetyl indigo per unit of weight of the textile or fiber to be dyed), and carry out the methods described herein to exhaust the entirety of the N,N'-diacetyl indigo onto a textile or textile fiber.

At the end of the dyeing process, the fiber or textile is washed by rinsing with water. Additional washing steps are optionally employed, for example washing with hot water, water plus one or more detergents, enzymes, cosolvents, or hot water with one or more such materials. The dyed fiber or textile is suitably washed and dried after dyeing and before measurement of color and subsequent use of the fiber or textile in one or more applications.

The methodology described herein results in a substantially uniform color throughout a dyed fiber or textile. In some embodiments the methodology provides a dyed textile that is substantially uniformly dyed as determined by L*, a*, and/or b* color measurements employing a standard illuminant. As a term of art, d50 LAB denotes the L*a*b* value relative to CIE standard illuminant D50. This result is surprising, because indigo itself subjected to the same methodology as described herein results in faded, uneven color delivered to any of the textiles described herein when compared to the same process carried out with N,N'-diacetyl indigo. The result is also surprising because when a textile is dyed using N,N'-diacetyl indigo in plain water (ionic strength of 0) instead of in the salt solution as described herein, the color development takes comparatively longer and the resulting color is less intense—that is, faded, higher in L* value—when compared to the same process carried out with a salt solution having an ionic strength of about 0.03 M to 1 M. Thus, it is the combination of the salt solution and the use of N,N'-diacetyl indigo that enable the methodology and the resulting dyed fibers and textiles.

Accordingly, described herein is a dyed fiber comprising or consisting essentially of a fiber and N,N'-diacetyl indigo. In embodiments the fiber is a textile fiber. Also described herein is a dyed textile, the dyed textile comprising or consisting essentially of N,N'-diacetyl indigo and a woven or nonwoven assembly of textile fibers. In embodiments the N,N'-diacetyl indigo is substantially uniformly distributed on a dyed fiber. In embodiments the N,N'-diacetyl indigo is substantially uniformly distributed on a dyed textile, such that the plurality of dyed textile fibers provide a measured L*a*b* color value that varies less than about 20%, for example less than 10%, in any one or more of L*, a*, and b* values between any two selected location on a dyed textile. Also described herein is a combination of a fiber with N,N'-diacetyl indigo, wherein the fiber comprises one or more polymers comprising polyamide, cellulose acetate, TENCEL®, LYOCELL®, or polyacrylonitrile.

In the nonlimiting examples set forth below, textiles dyed according to the methods described above that are substantially white prior to dyeing obtain values of L* between 50 and 80, a* values of about 0 to −5, and b* values of about 0 to −25.

The dyed fibers and textiles in some embodiments are suitably employed in applications such a consumer clothing, where intense and vibrant colors are desirable. Further, we have found that N,N'-diacetyl indigo exhausted onto textile fibers is durable to standard consumer washing and drying activities such as washing machine washing with agents such as fabric detergents and fabric softeners and drying in heated forced air conditions. The dyed textiles are subjected to between 2 and 100 such washing cycles while still retaining about 50% to 99% of the original weight of N,N'-diacetyl indigo applied to the textile during the dyeing process.

EXPERIMENTAL

Example 1

Indigo (1.0 g, 3.8 mmol) was suspended in 30 mL acetic anhydride with vigorous stirring while acetyl chloride (0.8 mL, 3 eq) was added. Heat was applied and the mixture was held at reflux and was stirred for 6 h and monitored by TLC. When the reaction was complete as determined by TLC, heat was removed and the crude reaction mixture was cooled to ambient temperature. The cooled mixture was poured into 100 mL water and this mixture was stirred for 15 minutes. A solid was observed to form during this time. The solid was isolated by filtration and dried. After drying, 0.98 g of a brick-red powder was obtained.

Examples 2-5

Textile materials were dyed using the N,N'-diacetyl indigo obtained using the procedure of Example 1. A stock solution of 40 g/liter of Glauber's salt (Na$_2$SO$_4$-decahydrate) in water was formed. Aliquots of the pH adjusted salt solution were added to a 50 mL or 100 mL beaker to provide a 40:1 to 50:1 ratio of volume of salt solution to the mass of the textile sample to be dyed (liquor ratio). A textile sample was immersed in the salt solution; then the desired amount of N,N'-diacetyl indigo powder was added to the beaker to form a dye bath with the intent of exhaustion, that is, wherein all the dye added to the salt solution is taken up by the textile. Then heat was applied to the dye bath having the textile sample immersed therein, and heating was continued until the dyeing process was complete. The dyeing was determined to be completed when either no N,N'-diacetyl indigo was observed in the salt solution, or no further color development of the textile sample was noted with progression of time. Once dyeing was judged to be complete, the textile sample was removed from the bath, rinsed with water, and air-dried before observations regarding dried textiles were recorded as shown in Table 1.

TABLE 1

Dyeing conditions and observations related to textiles dyed in Examples 2-5.

| Example | Textile, source | Observations: dyeing process | Observations: dyed textile |
|---|---|---|---|
| 2 | Nylon 6,6: Semi-Dull Taffeta, Scoured, Heat Set, basis weight approx. 59 g/meter$^2$; obtained from Testfabrics Inc. of W. Pittston PA | Heated to boiling; boiled 10-15 minutes; then no dye appeared to be left in the salt solution | Bright blue color; color uniform over entirety of textile sample |
| 3 | Acetate: 1401002 Acetate Tricot All Delustered Filament, basis weight approx. 78 g/meter$^2$; obtained from Testfabrics Inc. of W. Pittston PA | Heated to 70-80° C.; dye uptake observed. Temp. maintained for about 6 minutes; then no dye appeared to be left in the salt solution | Bright purple color; color appears uniform over entirety of textile sample |
| 4 | TENCEL ®: TJ20MA 100% Micro TENCEL ® Bleach PFD, Jersey knit, yield 8.00-8.50, obtained from Laguna Fabrics of Vernon, CA | Heated to boiling; boiled 15 minutes; no further color development noted on textile | Sky blue color; color appears uniform over entirety of textile sample |
| 5 | Acrylic: 1310006 Polyacrylnitrile ORLON ®, Type 75 Spun, Plain Weave, Iso 105-F05, basis weight approx. 140 g/meter$^2$; obtained from Testfabrics Inc. of W. Pittston PA | Heated to boiling; boiled 15 minutes; then no further color development noted on textile | Indigo color; color uniform over entirety of textile sample |

The colors obtained using this simple methodology employed are commercially desirable. In particular, the method appears to lead to exhaustion of N,N'-diacetyl indigo from the dye liquor in the case of polyamide and acetate textiles along with development of intense color. Other exhaustion type dyeing and textile treatment methods are therefore useful and commercially efficient methods for providing N,N'-diacetyl indigo dyed nylon and acetate textiles. One such method is continuous flex nip steam application, wherein the textile absorbs all the dye liquor applied and exhaustion is accomplished by a short period of steaming the liquor-saturated textile, after which other materials (in this case, water and salt) are rinsed from the dyed textile. Other useful methods adapted from the above understanding will be envisioned by one of skill in the art of dyeing textiles.

We further note that that lower liquor ratios may be enabled with the use of specialized dyeing equipment. We further note that lower temperatures may be enabled with the use of specialized dyeing equipment, in place of or in addition to lower liquor ratios. We note further still that an optimized and efficient dyeing process may require less time to produce dye exhaustion. As such, these small scale examples are predictive of commercially useful environmentally benign dyeing processes employing industry accepted standards for liquor ratio, temperature, and time.

Comparative Example C1

The procedure of Example 2 was repeated except no salt was added to the water. Upon heating, the dye bath reached a low boil after 10 minutes. The first visible uptake of blue color was observed after 19 minutes. Dyeing was continued for a total of 30 minutes. N,N'-diacetyl indigo was observed to be present in the bath at the end of the 30 minutes. The textile was removed from the bath, rinsed, and dried. The textile color was similar but substantially faded when compared to the textile color obtained in Example 2. The textile was found to have a total of 1.3% wof. The d50 LAB color space (L*a*b* values relative to CIE standard illuminant D50) was measured and found to be L=62; a=−8.6; b=−22.9.

Examples 6-13

Textile materials were dyed using the N,N'-diacetyl indigo obtained using the procedure of Example 1. A stock solution of 20 g/liter NaCl in water was formed. Aliquots of the salt solution were added to a 50 mL or 100 mL beaker to provide a 40:1 to 50:1 ratio of volume of salt solution to the mass of the textile sample to be dyed (liquor ratio). A desired amount of N,N'-diacetyl indigo powder was added to the salt solution with the intent of exhaustion. Then heat was applied to the dye bath. When the temperature of the dye bath was 30-35° C., the selected textile sample was immersed in the dye bath. Heating was then continued until the dyeing process was complete. The dyeing was determined to be completed when N,N'-diacetyl indigo appeared to be exhausted from the bath, or when no further color development of the textile sample was noted with progression of time, or when evaporative loss exceeded about 50% of initial volume. Once dyeing was judged to be complete, the textile sample was removed from the bath, rinsed with water, and air-dried before observations regarding dried textiles were recorded as shown in Table 2.

TABLE 2

Dyeing conditions and observations related to textiles dyed in Examples 6-13. Percent weight on fiber is based on the amount of weight added to the textile after dyeing, rinsing, and drying.

| Example | Textile, source | N,N'-diacetyl indigo, % wof, actual | Observations: dyeing process | d50 LAB color space of dyed textile and other observations |
|---|---|---|---|---|
| 6 | Nylon 6,6: Semi-Dull Taffeta, Scoured, Heat Set, basis weight approx. 59 g/meter$^2$; obtained from Testfabrics Inc. of W. Pittston PA | 3 | Bath reached a low boil after 2 minutes; first visible uptake of color was seen after a total of 3 minutes. Dyeing was continued for a total of 13 minutes (evaporative losses exceeded 50% of volume) | L = 56.5; a = −2.8; b = −18.4; color uniform over entirety of textile sample |
| 7 | Acetate: 1401002 Acetate Tricot All Delustered Filament, basis weight approx. 78 g/meter$^2$; obtained from Testfabrics Inc. of W. Pittston PA | 3 | After 3 minutes the bath reached 75° C. and the first uptake of color was observed. Heating and dyeing was continued for a total of 12 minutes (evaporative losses exceeded 50% of volume) | L = 58.3; a = −0.6; b = −22.0; color uniform over entirety of textile sample |
| 8 | TENCEL ®: TJ20MA 100% Micro TENCEL ® Bleach PFD, Jersey knit, yield 8.00-8.50, obtained from Laguna Fabrics of Vernon, CA | 2 | After 2 minutes the bath reached a low boil. The first uptake of color was observed after 3 minutes total. Heating was continued for a total of 40 minutes (evaporative losses exceeded 50% of volume) | L = 69.9; a = −0.1; b = −8.0; color uniform over entirety of textile sample |
| 9 | Acrylic: 1310006 Polyacrylnitrile ORLON ®, Type 75 Spun, Plain Weave, Iso 105-F05, basis weight approx. 140 g/meter$^2$; obtained from Testfabrics Inc. of W. Pittston PA | 2 | After 7 minutes the bath reached a low boil. The first uptake of color was observed after 9 minutes dye time. Heating and dyeing was continued for a total of 30 minutes (evaporative losses exceeded 50% of volume) | L = 73.5; a = 0.5; b = −13.3; color uniform over entirety of textile sample |
| 10 | Polyester: Texturized Polyester Interlock Knit Fabric (Disperse Dyeable) basis weight approx. | 1.5 | After 2 minutes the bath reached 65° C. and the first uptake of color was observed in the form of blotches on the fiber. After 4 minutes total the bath temperature reached | L = 59.6; a = −2.1; b = −17.4; color uniform over entirety of textile sample |

TABLE 2-continued

Dyeing conditions and observations related to textiles dyed in
Examples 6-13. Percent weight on fiber is based on the amount of
weight added to the textile after dyeing, rinsing, and drying.

| Example | Textile, source | N,N'-diacetyl indigo, % wof, actual | Observations: dyeing process | d50 LAB color space of dyed textile and other observations |
|---|---|---|---|---|
| | 106 g/meter²; obtained from Testfabrics Inc. of W. Pittston PA | | 80° C.; at this temperature the fabric took on a uniform light pink color. After 9 minutes total the bath reached a low boil, and a blue color was observed to develop. Heating was continued for a total of 23 minutes (evaporative losses exceeded 50% of volume) | |
| 11 | Silk: 1413007 Silk Habutae 8 mm, basis weight approx. 36 g/meter²; obtained from Testfabrics Inc. of W. Pittston PA | 7 | After 4 minutes, the bath reached 80° C. and first uptake of color was observed. Heating was continued for a total of 25 minutes (evaporative losses exceeded 50% of volume) | L = 58.9; a = 2.6; b = −12.2; color uniform over entirety of textile sample |
| 12 | Wool: 1417003 Wool Jersey Knit Fabric, basis weight approx. 177 g/meter²; obtained from Testfabrics Inc. of W. Pittston PA | 1 | After 4 minutes the bath reached a low boil, and first uptake of color was observed. Heating was continued for a total of 30 minutes (evaporative losses exceeded 50% of volume) | L = 43.4; a = 7.8; b = 0.0; color uniform over entirety of textile sample |
| 13 | Cotton: 1403035 Unbleached Cotton Interlock Knit 30" Tubular, basis weight approx. 198 g/meter²; obtained from Testfabrics Inc. of W. Pittston PA | 4 | After 4 minutes the bath reached a low boil. First uptake of color was observed after 6 minutes; color uptake was observed to continue for a total of 20 minutes, when evaporative losses exceeded 50% of volume | L = 70.0; a = 3.4; b = −2.1; color uniform over entirety of textile sample |

Example C2

The procedure of Example 6 was repeated except using indigo instead of N,N'-diacetyl indigo, further wherein the nylon 6,6 was placed in the dye bath prior to heating. Upon heating, the dye bath reached a low boil after about 6 minutes; boiling was continued for 20 min while uneven, blotchy uptake was observed over visible textile surfaces. At the end of the 20 minutes, the textile was removed from the bath, rinsed, and dried. A photograph of the textile is shown in FIG. 1.

What is claimed is:

1. A method of dyeing a fiber, the method comprising: contacting the fiber with a dye liquor at a dye liquor temperature of about 30° C. to 115° C. to form a dyed fiber, the dye liquor comprising N,N'-diacetyl indigo and a salt solution having ionic strength of about 0.03 M (moles/liter) to 1 M and pH of about 3 to 8 at 20° C.

2. The method of claim 1 wherein the contacting is carried out for a contact period of about 10 seconds to 30 minutes.

3. The method of claim 1 wherein the salt solution comprises about 1 wt % to 10 wt % salt.

4. The method of claim 1 wherein the N,N'-diacetyl indigo is present in the dye liquor at a weight ratio of 1 part N,N'-diacetyl indigo to about 2 to 1000 parts salt solution.

5. The method of claim 1 further wherein the dye liquor is formed by combining water, salt, and N,N'-diacetyl indigo in any order.

6. The method of claim 1 wherein the salt solution comprises two or more salts.

7. The method of claim 1 wherein the salt solution comprises an inorganic salt.

8. The method of claim 7 wherein the salt is selected from sodium chloride, sodium sulfate, or a combination thereof.

9. The method of claim 1 wherein the dye liquor comprises one or more adjuvants.

10. The method of claim 1 wherein the contacting comprises immersing the fiber in the dye liquor.

11. The method of claim 1 wherein the contacting is following by washing the fiber with water.

12. The method of claim 1 wherein the fiber is a textile fiber.

13. The method of claim 12 wherein the textile fiber is a discrete portion of a textile.

14. The method of claim 12 wherein the textile fiber comprises a polyamide, a polyester, a cellulose, a cellulose acetate, a hemicellulose, a polyacrylonitrile, cotton, wool, silk, or blends or copolymers of two or more thereof.

\* \* \* \* \*